Feb. 5, 1924.　　　　　　　1,482,918
F. DUTCHER
COMPRESSIBLE SPRING
Filed May 26, 1922
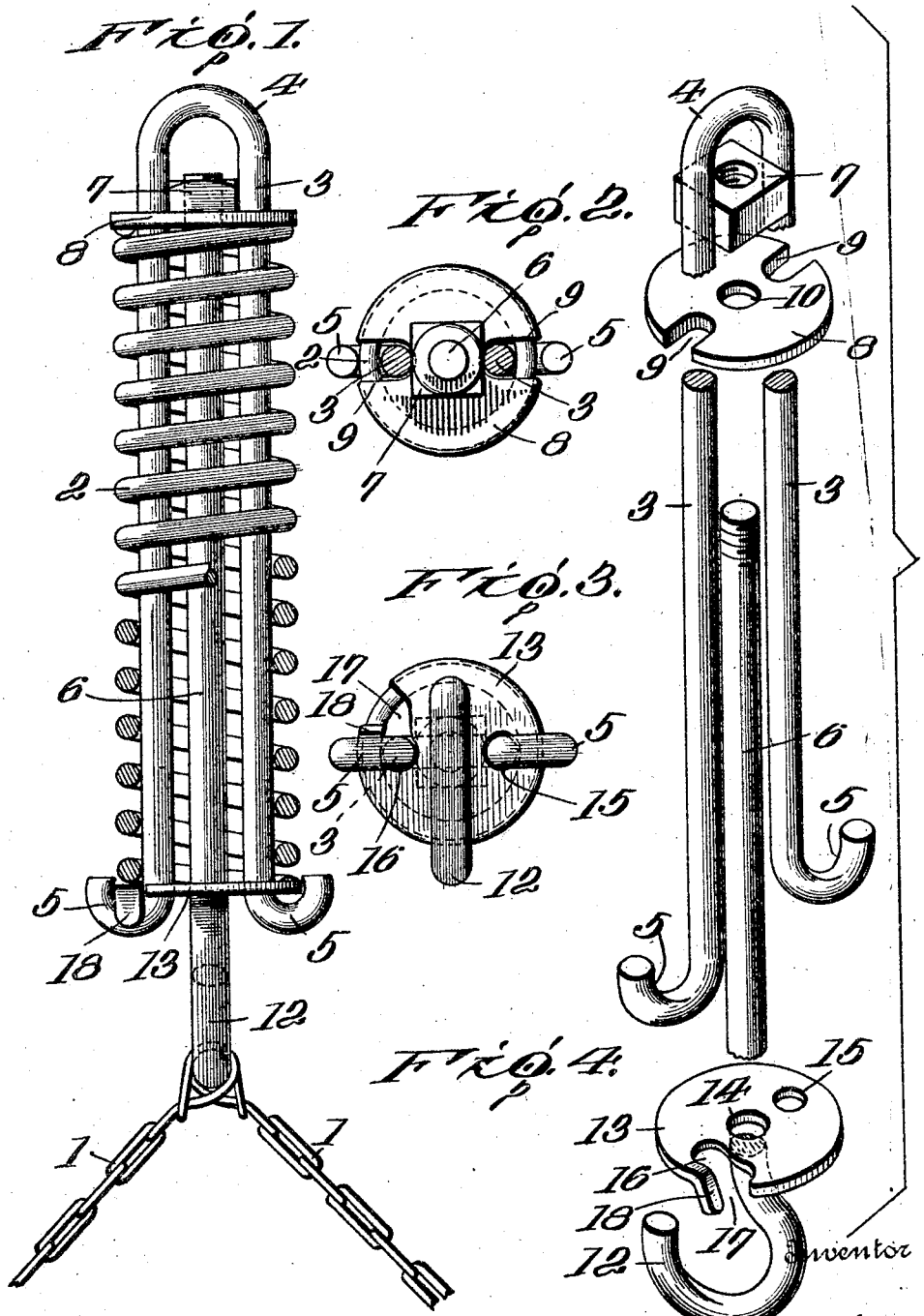

Patented Feb. 5, 1924.

1,482,918

UNITED STATES PATENT OFFICE.

FRANK DUTCHER, OF VERSAILLES, PENNSYLVANIA.

COMPRESSIBLE SPRING.

Application filed May 26, 1922. Serial No. 563,805.

*To all whom it may concern:*

Be it known that I, FRANK DUTCHER, a citizen of the United States, residing at Versailles, in the county of Allegheny and State of Pennsylvania, have invented certain new and useful Improvements in Compressible Springs, of which the following is a specification, reference being had therein to the accompanying drawing.

This invention relates to an improvement in compressible springs and is particularly intended as a support for a porch swing, or any other similar relations, and is adapted for use wherever a compressible spring having the characteristics hereinafter set forth is desired.

The primary object of my invention is to provide a compressible spring arrangement wherein its parts are readily assembled and disassembled, making it cheap of manufacture.

Another object of my present invention is to make a compressible spring which is normally of a length substantially equal to the distance between the parts holding the spring in position whereby it is readily put together and readily detached.

A further object of my invention is to make a compressible spring in which all of the parts are locked in position when they are assembled, whereby the spring can not become loose and give way under tension.

A further object of my present invention is to make a compressible spring in which the parts are so arranged that the breaking of the spring will not let the swing or other objects supported by it fall, as would be the case with an expansible.

Further objects of the invention will appear from the description.

In the accompanying drawings:

Fig. 1 is a side elevation partly in section of my spring showing it assembled for operation.

Fig. 2 is a cross sectional view of Fig. 1 at a point above the central bolt, showing the construction of the supporting washer.

Fig. 3 is an inverted plan view of the lower end of the spring showing the method of locking the supporting washer at the lower end of the spring.

Fig. 4 is a detached perspective view of the parts showing them in dissembled positions and omitting the spring.

The spring comprising my present invention is more particularly adapted for supporting a porch swing by means of chains 1 which will have their opposite ends connected to one end of the side of the porch swing (not shown).

In carrying out my present invention I provide a coil spring 2 and I combine with this coil spring a U-shaped bolt 3 of a size and shape to pass loosely through the spring 2.

This U-shaped bolt or member 3 is sufficiently longer than the spring to form at its top an eye 4 which will receive the sealing hook (not shown), and its opposite lower ends extend through the spring and are doubled outward into the hooks 5.

Combined with the U-shaped member 3 is a centralized bolt 6 which passes up through the spring. The upper end of the bolt 6 is externally screw-threaded to receive a nut 7, and the nut 7 rests upon the washer 8. This washer 8 is made larger in diameter than the diameter of the spring 2 and rests upon the uper end of the spring. I lock this washer 8 against rotation by providing it with oppositely extending slots 9 through which the parallel legs of the U-shaped member 3 passes, and it is also provided with a central opening 10 through which the straight bolt 6 passes. Attention is called to the fact that the nut 7 is of such a size that it is locked by engaging the side walls of the legs of the member 3. The lower end of the bolt 6 is provided with a suitable hook 12, which hook is adapted to receive the chains 1 of the porch swing or to be attached to any other desired object.

At the lower end of the spring is a washer 13 of a diameter equal to the diameter of the spring and upon which the lower end of the spring rests. This washer 13 is provided with a central opening 14 for the rod 6 to pass through, and an opening 15 to receive one of the hooks 5. The washer opposite the opening 15 is provided with a slot 16 having an open end 17 whereby the other hook 5 may be passed through it. Preferably I have the outer free wall 18 of the slot turned downward as shown to lock against the U-shaped member. The principle object in having the turned down end is to form an opening through which the leg of the member 3 may pass, because when the parts are assembled the washer 3 can not rotate irrespective of the bent end 18. By making the bend 18 form a lock the parts are held together against rotary movement before the insertion of the rod 6.

Particular attention is called to the fact that the spring 2 is normally of a length equal to the distance between the washers 8 and 13, whereby the spring is capable of being assembled without the use of any implements for the purpose of compressing the spring. When the parts are dissembled the spring 2 is of the length shown in the drawing.

From the foregoing description it will be observed that the spring when assembled is absolutely locked against any accidental release by reason of the fact that the chains 1 prevent the rotation of the bolt. If desired however when the parts are assembled merely a swaging tap on the end of the bolt above the bolt 7 would lock it against rotation. When the parts are assembled the washers are absolutely locked in the position shown.

Having thus described my invention what I desire to claim and secure by Letters Patent is:

1. A compressible spring comprising a coil spring, a U-shaped member having its free ends provided with out-turned hooks and passing longitudinally through the spring and of a length extending beyond the spring to form an eye, a washer having a slot and an opening for the free ends of the U-shaped member and located between that end of the spring and the hooks, the outer wall of the slot of the washer turned downward, a washer for the opposite end of the spring provided with oppositely extending slots to receive the legs of the U-shaped member, the washers having centralized openings, a rod passing through said openings with its screw-threaded end at the bend of the U-shaped member, a nut on the screw-threaded end locked by engagement with the legs thereof, the opposite end of the bolt provided with supporting means for the purpose described.

2. A compressible spring comprising a coil spring, a U-shaped member having its ends provided with out-turned hooks passing longitudinally through the spring, a washer having a slot and an opening for the free ends of the U-shaped member and located between that end of the spring and the hooks, the outer wall of the slot turned downward and the washer provided with a centralized opening, and a rod passing through said center washer opening and supported above the end of the spring remote from said washer, for the purpose described.

3. A compressible spring comprising a coil spring, longitudinal members extending in opposite directions in respect to the spring, washers at each end of the spring, a longitudinal bar passing through the spring and through the washers, and one of said washers having a portion bent downwardly at right angles, for the purpose described.

In testimony whereof I hereunto affix my signature.

FRANK DUTCHER.